(12) United States Patent
Van de Lande (10) Patent No.: US 6,375,157 B1
(45) Date of Patent: Apr. 23, 2002

(54) SLIDE VALVE

(75) Inventor: Theodorus Gabriel Antonius Van de Lande, Raamsdonksveer (NL)

(73) Assignee: Van de Lande en Zonen B.V.

( * ) Notice: Subject to any disclaimer, the term of this patent is extended or adjusted under 35 U.S.C. 154(b) by 0 days.

(21) Appl. No.: 09/272,982

(22) Filed: Mar. 19, 1999

(30) Foreign Application Priority Data

Mar. 20, 1998 (NL) .............................................. 1008658

(51) Int. Cl.[7] .................................................. F16K 3/00
(52) U.S. Cl. ........................ 251/327; 251/328; 251/368
(58) Field of Search ................. 251/328, 327, 251/368

(56) References Cited

U.S. PATENT DOCUMENTS

| | | | | |
|---|---|---|---|---|
| 2,731,231 A | * | 1/1956 | Garrot | 251/328 |
| 3,000,608 A | * | 9/1961 | Williams | 251/329 X |
| 3,033,517 A | * | 5/1962 | Rovang et al. | 251/328 X |
| 3,829,061 A | * | 8/1974 | Dayne et al. | 251/328 |
| 3,906,992 A | * | 9/1975 | Leach | 251/328 X |
| 4,051,863 A | * | 10/1977 | Still | 251/328 X |
| 4,148,458 A | * | 4/1979 | Holtgraver | 251/148 |
| 4,206,905 A | * | 6/1980 | Dobler | 251/328 |
| 4,225,115 A | * | 9/1980 | Miller | 251/327 |
| 4,377,274 A | * | 3/1983 | Mayhew, Jr. | 251/328 X |
| 4,429,710 A | * | 2/1984 | Grieves et al. | 251/328 X |
| 4,592,534 A | * | 6/1986 | Ueda et al. | 251/327 X |
| 5,083,749 A | * | 1/1992 | Linderman et al. | 251/214 |
| 5,154,397 A | * | 10/1992 | Thomas et al. | 251/328 |
| 5,549,278 A | * | 8/1996 | Sidler | 251/328 |

* cited by examiner

Primary Examiner—Kevin Shaver
Assistant Examiner—John Bastianelli
(74) Attorney, Agent, or Firm—Jones, Day, Reavis & Pogue (57) ABSTRACT

A valve substantially made of plastic material having a housing which is connected to a conduit for a flowing medium, which housing contains a slide which is capable of movement transversely to the direction of flow of said medium between a closed position, in which the flow can be shut off, and an open position, in which said flow can be released, wherein the housing has a lower housing, for the connection, and an upper housing for the slide, which is detachably connected therewith.

16 Claims, 7 Drawing Sheets

SLIDE VALVE

BACKGROUND OF THE INVENTION

1. Field of the Invention

The invention relates to a slide valve substantially made of plastic material comprising a housing which is provided with connecting means for connecting said housing to a conduit for a flowing medium, which housing contains a slide which is capable of movement transversely to the direction of flow of said medium between a closed position, in which the flow can be shut off, and an open position, in which said flow can be released. It is noted that the above conduit is in particular a conduit, tube or pipe of plastic material.

2. Description of the Prior Art

It is generally known to use a plastic ball valve or a plastic butterfly valve, for example, for shutting off the flow of a medium in plastic piping. In a ball valve, a ball is clampingly provided between two seats, whereby the valve can be closed or opened by rotation so as to shut off or release the flow by means of said ball. Although the known ball valve has the advantage that the ball is not disposed in the flow in any manner in the open position, it is experienced to be a drawback not only that the valve consists of a relatively large number of parts, but especially that it is highly liable to fouling, in particular when used with viscous media. Another drawback is moreover the fact that the effective passage of a ball valve is smaller than the nominal diameter of the pipe of the system of pipes that is to be connected thereto. Another drawback of the known ball valve is finally the fact that automatic control thereof is rather complicated, since the rotation of the valve requires a substantial moment, which may result in the valve breaking loose. Furthermore, plastic butterfly valves, for example, are known for shutting of the through-flow. With this type of valve, a butterfly-like body is rotated in order to open or close the valve. The advantage of this is the fact that the valve is less sensitive to fouling, but it is experienced to be a drawback that a completely free flow is not possible, since the butterfly-like body extends parallel to the direction of flow in the open position. In addition, dirt accumulates against the butterfly-like body, in particular with viscous media, which interferes with the free flow.

It will be apparent that in practice the known valves in the form of ball valves or butterfly valves have appeared to be unsuitable for shutting off the flow of in particular viscous media in a network of pipes. Accordingly, the invention relates especially, but not exclusively, to the shutting off of the flow of viscous media by using a slide valve. The term viscous medium is understood to mean a thick, liquid medium or a liquid containing solid constituents. However, slide valves as such are generally known. With the known slide valve, the housing consists of various parts which are fitted together by means of bolt/nut and/or riveted connections. The connecting means of the known slide valves comprise "sockets" or "sleeves", which are in turn connected to the piping by means of a glued connection. The result of all this is that replacement or repair of the known slide valve involves the removal of the valve as a whole from the piping, which in practice often means that the slide valve must be sawed out of the piping at the location of the glued connections. Replacing a packing for the valve is done by loosening the relevant bolt/nut and/or rivetted connections of the slide valve housing. A consequent drawback of this is furthermore the fact that automatic control of the valve is generally impractical with the known slide valve.

Accordingly, it is an objective of the present invention to provide an inexpensive and efficiently operating slide valve substantially made of plastic material, in particular for shutting off the flow of viscous media in piping, which enables easy replacement, repair, cleaning and/or inspection of the slide valve as a whole or of parts thereof, which allows the use of all various media pressures (with the restrictions imposed thereon by the design, of course), and which exhibits a low sensitivity to fouling. In order to accomplish that objective, a valve of the kind referred to in the introduction is characterized in that the housing comprises a lower housing, in which the connecting means are present, and an upper housing for the slide, which is detachably connected therewith. Preferably, the lower and the upper housing are detachably interconnected by means of a bolt/nut connection, a screwed connection, a connection comprising plastic inserts, a clamped connection or a dovetail connection. Inspection, repair or replacement is very easy with the present slide valve, since the upper housing accommodating the slide can easily be removed in upward direction, whilst the lower housing will remain present in assembled condition in the pipework.

SUMMARY OF THE INVENTION

In one preferred embodiment of a valve according to the invention, the lower housing and the connecting means are made in one piece. More in particular, the entire housing, that is, the lower housing and the upper housing, is formed by means of an injection molding technique.

In another preferred embodiment of a valve according to the invention, the housing and/or the slide is (are) at least substantially made of non-reinforced plastic material. It is thereby preferred to use a non-reinforced plastic selected from the group consisting of PVC-U, PE, PP, ABS, PVC-C and PVDF. In another preferred embodiment, the housing and/or the slide is (are) made of a reinforced plastic material, for example glass fibre or a mineral-reinforced plastic. It is noted that the above material designations relate to the following (plastic) materials:

| | |
|---|---|
| PVC-U | polyvinyl chloride (without plasticizer) |
| PP | polypropylene |
| PE | polyethylene |
| ABS | acrylonitrile-butadiene-styrene |
| PVC-C | polyvinyl chloride (post-chlorinated) |
| PVDF | polyvinylidene fluoride |

In another preferred embodiment of a valve according to the invention, the slide is at least substantially made of a metal, preferably stainless steel. The slide is preferably controlled by means of a manually, mechanically, electrically, pneumatically or hydraulically operated driving mechanism. The metal slide may be coated with a plastic or a rubber.

In another preferred embodiment of a valve according to the invention, the connecting means comprise a flanged connection, a threaded connection, a key/sleeve connection and/or a glued connection, whereby "sockets" or "sleeves" present on the lower housing are accordingly fixed to piping. All this will be explained in more detail yet in the description of the figures.

Another preferred embodiment of a valve according to the invention comprises a seal provided in the lower housing, which seal is in particular detachably provided in a correspondingly shaped recess in the lower housing. Preferably, the seal can form a guide for the slide thereby. The seal thus incorporates three different functions: sealing the slide with respect to the flowing medium, sealing the lower housing and the upper housing from the outside, and, as already mentioned before, guiding the slide.

In another preferred embodiment of a valve according to the invention, the seal is at least substantially an envelope-like seal. The seal has in particular been formed by means of an injection moulding technique, using a rubber, preferably selected from the group consisting of NBR (nitrile butadiene rubber), EPDM (ethylene/polypropylene/diene/monomer) and F. P.M. (fluorocarbon elastomer), known under the brand name "Viton".

DESCRIPTION OF THE DRAWINGS

The invention will be explained in more detail hereafter with respect to figures illustrated in a drawing of a preferred embodiment of the invention, wherein.

DETAILED DESCRIPTION OF THE INVENTION

Figure 1:
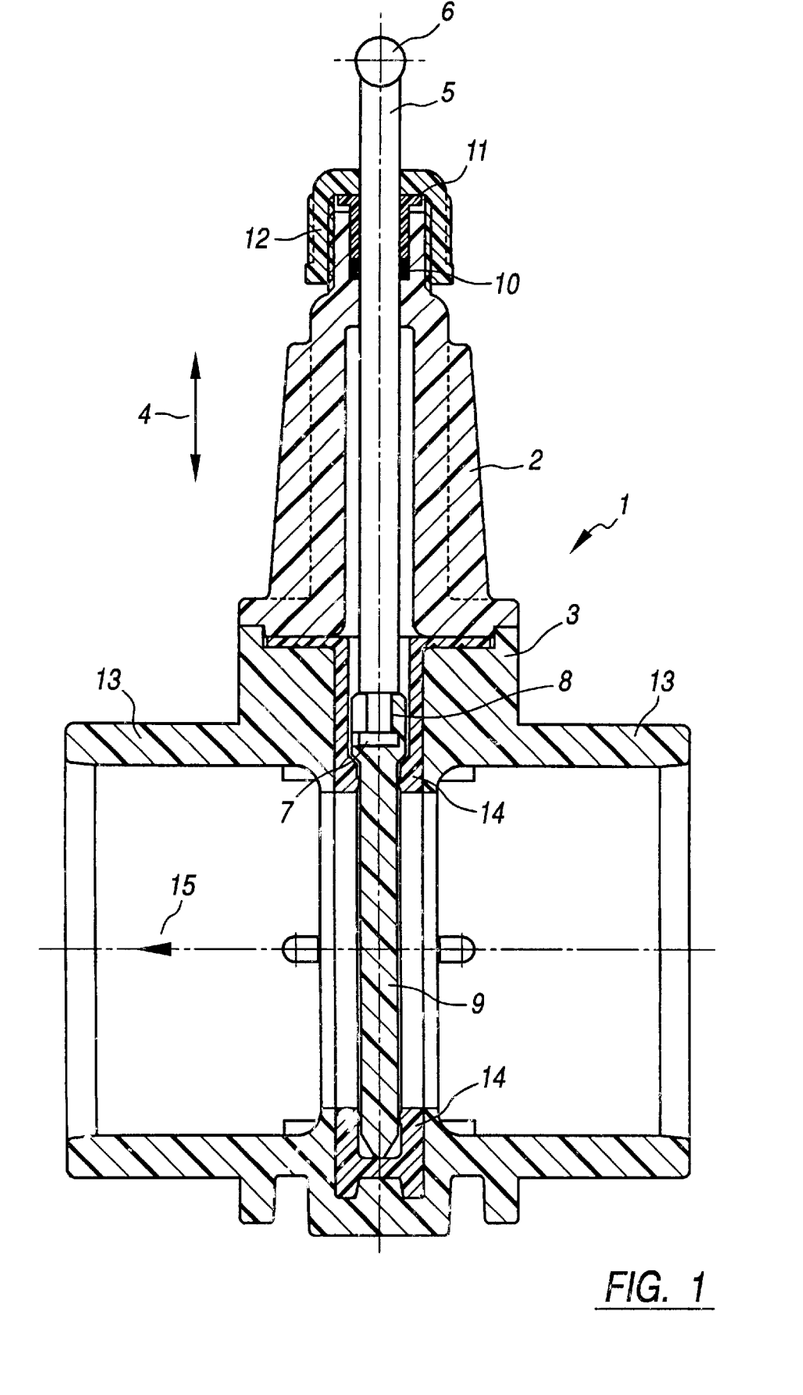
FIG. 1 is a schematic cross-sectional view of a valve according to the invention.

FIG. 1 shows a slide valve which comprises a housing 1 consisting of an upper housing 2 and a lower housing 3, which have both been made of PVC-U by means of an injection moulding technique, and which are interconnected by means of bolts and nuts (not shown). Present in upper housing 2 is a pin or rod 5, which is capable of reciprocating movement in the direction indicated by arrows 4. Said rod 5 is integrally provided at its free end with a handle 6, to facilitate manual operation, and at its opposite end with a T-piece 7. The T-piece 7 is accommodated with a proper fit in a correspondingly shaped recess 8 in the end facing said T-piece of a plate-shaped slide 9 which is made of a non-reinforced plastic (for example PVC-U). When rod 5 is moved upwards and downwards in the direction indicated by arrows 4, slide 9 will move along and thus shut off and release, respectively, the flow through lower housing 3. Rod 5 is sealingly accommodated in upper housing 2 by means of an O-ring 10 and a pressure ring 11 provided thereon, which are firmly fixed in upper housing 2 by means of a union 12.

Lower housing 3 is provided on either side with connecting means in the form of a "socket" or pipe portion 13, which is made in one piece of PVC-U with lower housing 3. Both pipe portions 13 are connected to a pipe (not shown), wherein the pipe fits in the respective pipe portion 13, using an adhesive. Furthermore a seal or packing 14, which has been formed of EPDM by means of an injection molding technique, is detachably accommodated in lower housing 3, in a correspondingly shaped recess which is present therein. Packing 14 not only serves to seal plate-shaped slide 9 with respect to a medium flowing in the direction of arrow 15, but also to seal lower housing 3 and upper housing 2 from the outside, and finally to guide slide 9.

The fact is that slide 9 fits packing 14, whereby said packing 14 is in the form of an "envelope", as it were. Since packing 14 seals slide 9 both in upstream and in downstream direction, the expected direction of flow of the medium does not play a role at all upon mounting slide 9 and packing 14. It is noted in this connection that the pressure difference of the medium in the pipe causes plate-shaped slide 9 to exert a pre-tension on packing 14, thus effecting the seal. A separate pre-tension on slide 9 need not be provided, therefore.

Figure 2:
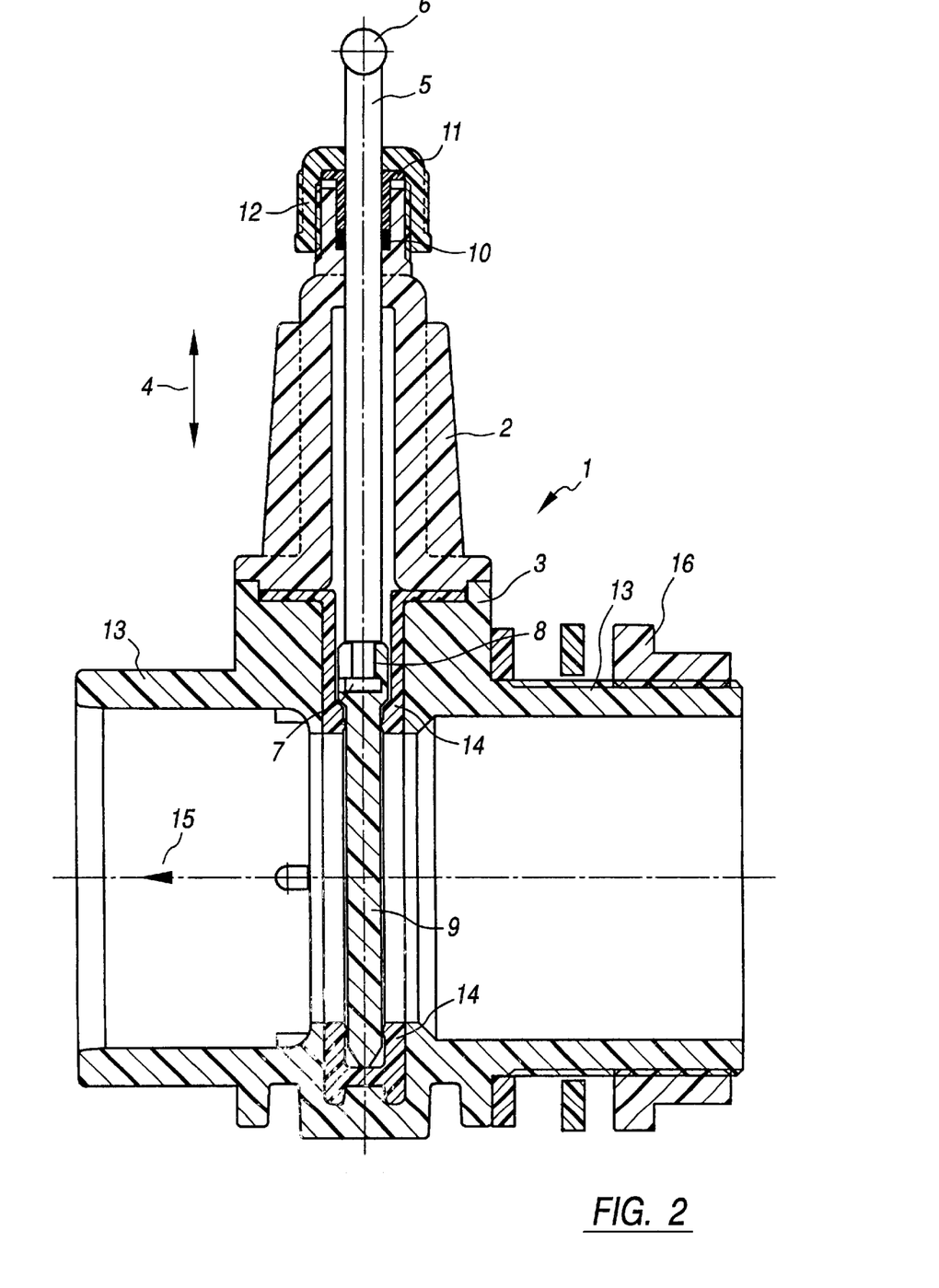
FIGS. 2 and 3 correspond with FIG. 1, with this understanding that the connections with piping are different.
Figure 3:
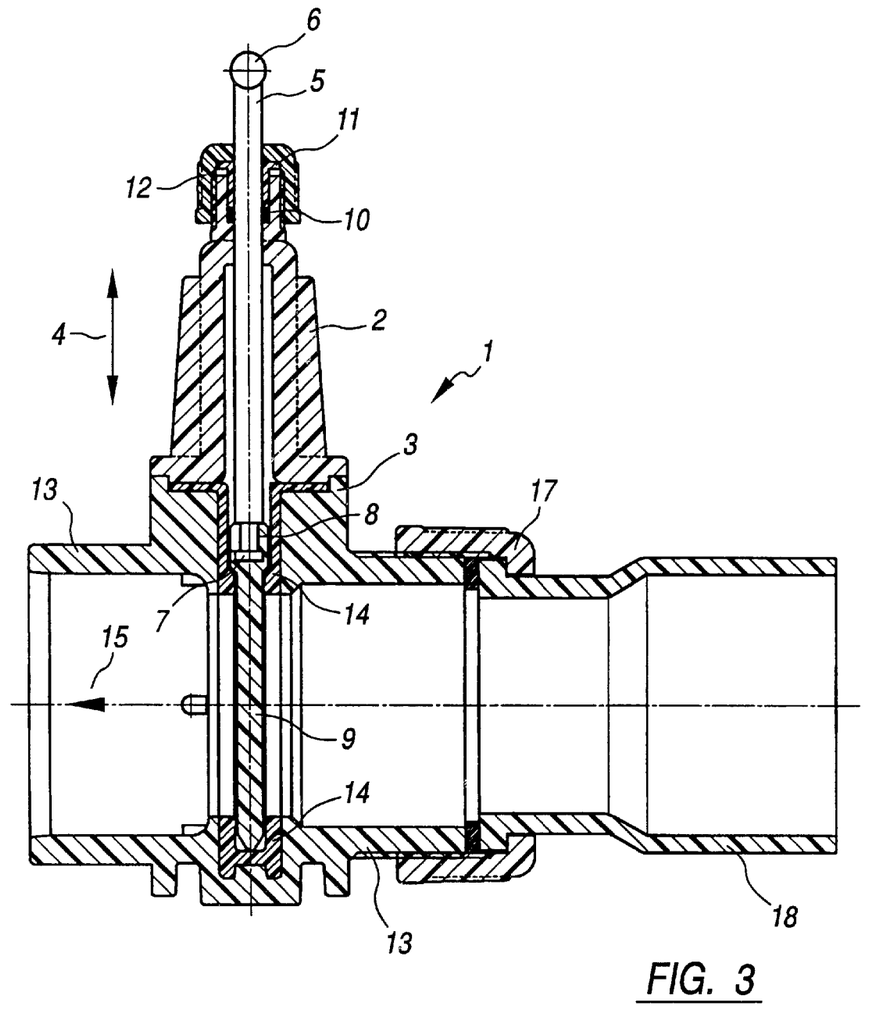

FIGS. 2 and 3 correspond with FIG. 1, with corresponding parts being indicated by the same numerals. The upstream pipe portion 13 of lower housing 3 in FIG. 2 is connected, by means of a glue, to a pipe (not shown) which fits therein, whilst the upstream pipe portion 13 thereof is externally threaded for the purpose of being connected to a bushing 16. This enables direct mounting on a tank. In FIG. 3, pipe portions 13 of lower housing 3 correspond with those of FIG. 2, with this understanding that the upstream pipe portion 13 is fixed to a pipe or tube 18 by means of a union 17.

Figure 4:
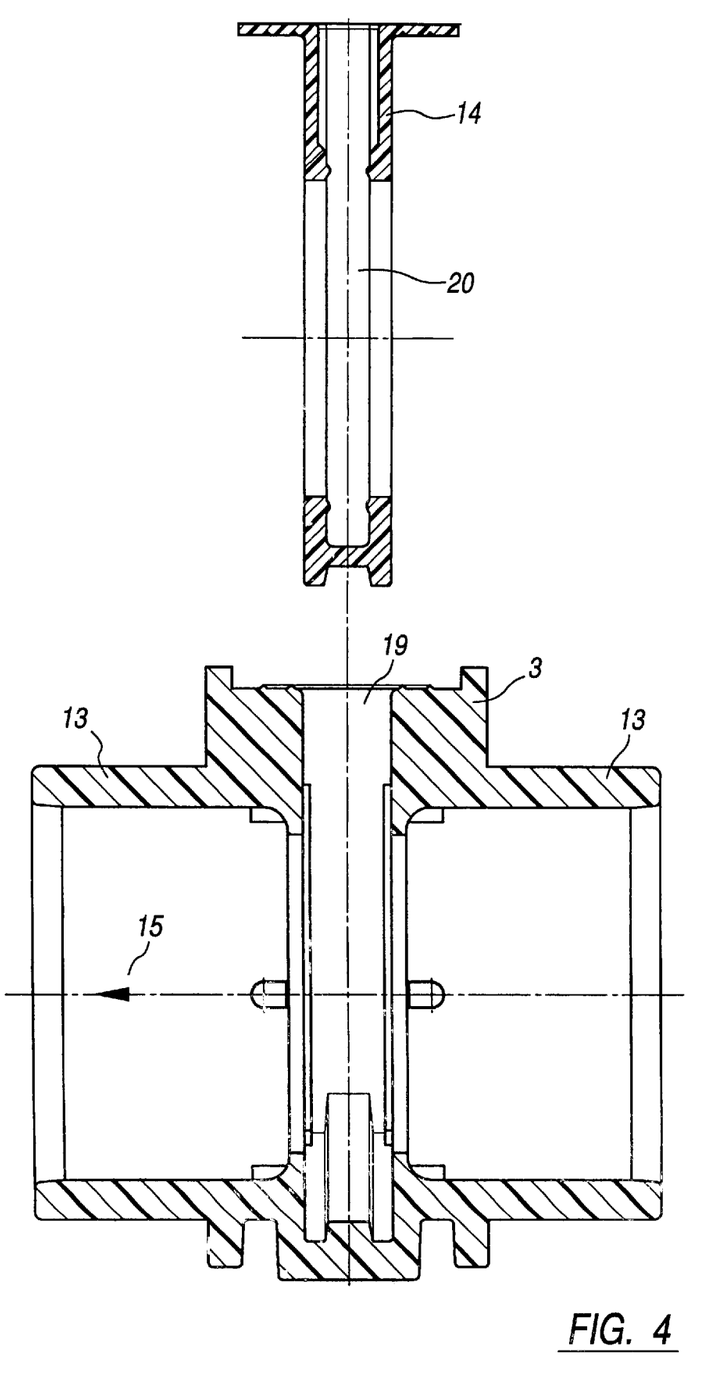
FIG. 4 shows a schematic, cross-sectional view of a lower housing and a seal as used in the valve of FIG. 1.

FIG. 4 shows the manner in which packing 14, which seals plate-shaped slide 9 on either side thereof, can be detachably received with a proper fit in a correspondingly shaped recess 19 in lower housing 3.

Figure 5:
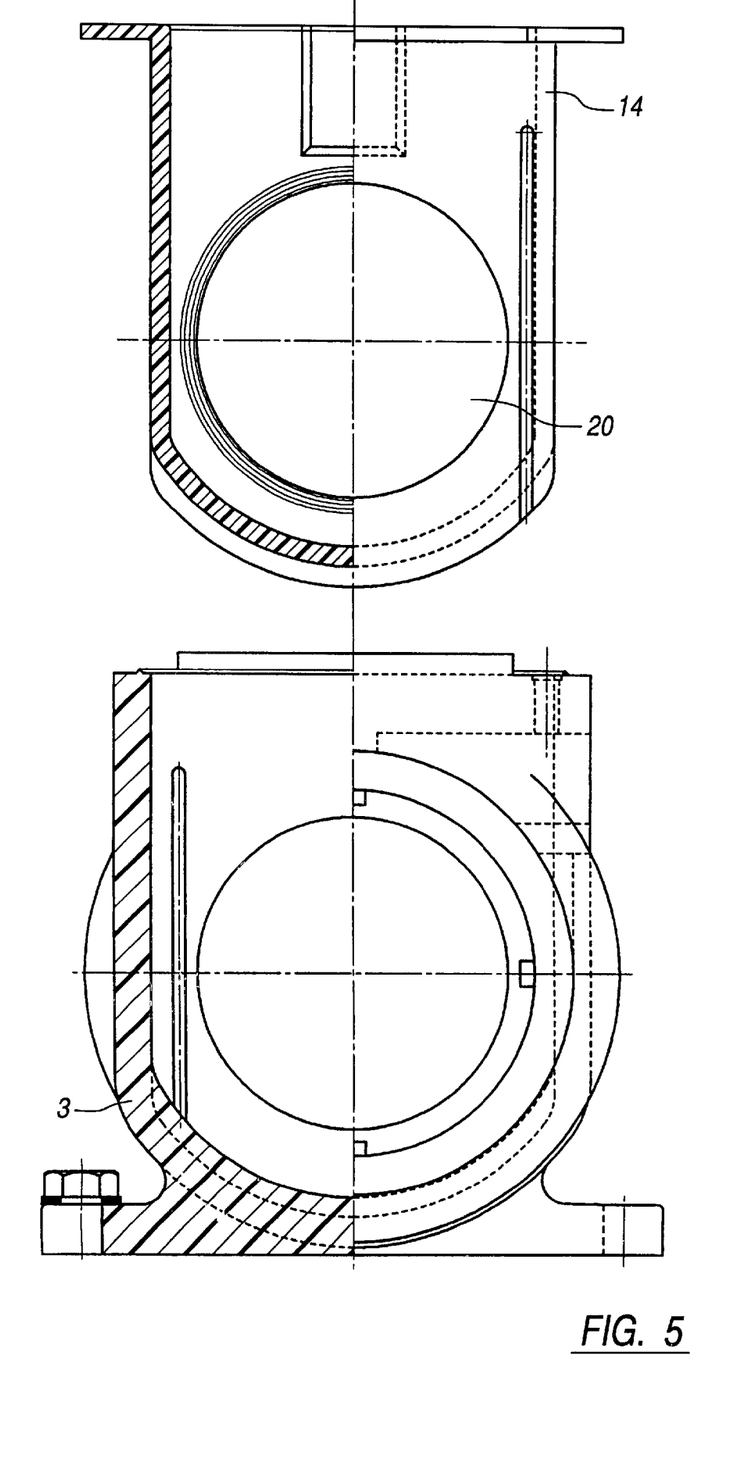
FIG. 5 corresponds with FIG. 4, with this understanding that a different cross-section is shown.

FIG. 5 corresponds with FIG. 4, with this understanding that the various parts are shown in cross-sectional view, transversely to the direction of flow 15. As shown, packing 14 comprises a circular through opening 20, which can be closed by plate-shaped slide 9. Accordingly, packing 14 will remain stationary in its position in lower housing 3 upon return movement of slide 9 to upper housing 2, whereby packing 14 can be removed for inspection, cleaning, repair or replacement upon demounting of upper housing 2. This also applies to slide 9: upper housing 2 can be demounted from lower housing 3 for the purpose of inspecting, cleaning, repairing or replacing slide 9 without having to detach lower housing 3 and its pipe portions 13 from the piping.

Figure 6:
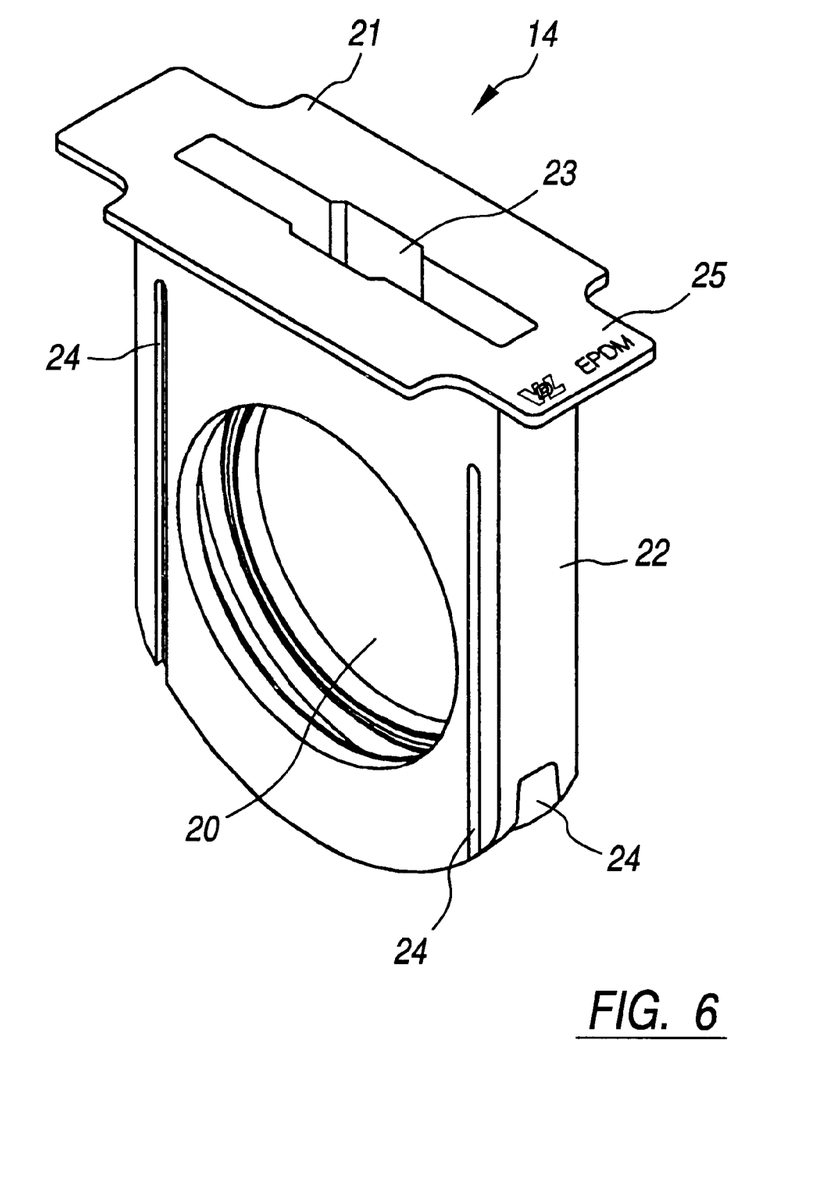
FIG. 6 is a schematic, perspective view of the seal of FIG. 1.

FIG. 6 shows in perspective view the packing 14 comprising circular through opening 20, which has been formed in one piece of EPDM by means of an injection molding technique. Packing 14 comprises a plate-shaped collar 21, which is supported on corresponding shoulders present on lower housing 3 in mounted condition (FIG. 1), as well as a body 22, into which plate-shaped slide 9 can be inserted via an opening 23 (FIG. 1). Furthermore, grooves 24 are provided for positioning packing 14 upon assembly, retaining packing 14 in position upon operation of the slide valve (in open or closed operating condition), and retaining packing 14 in position when media flow through, in order to prevent it from being "sucked along". Packing 14 may furthermore contain a lip 25 carrying a material code, which can be read on the outside of the slide valve.

Figure 7:
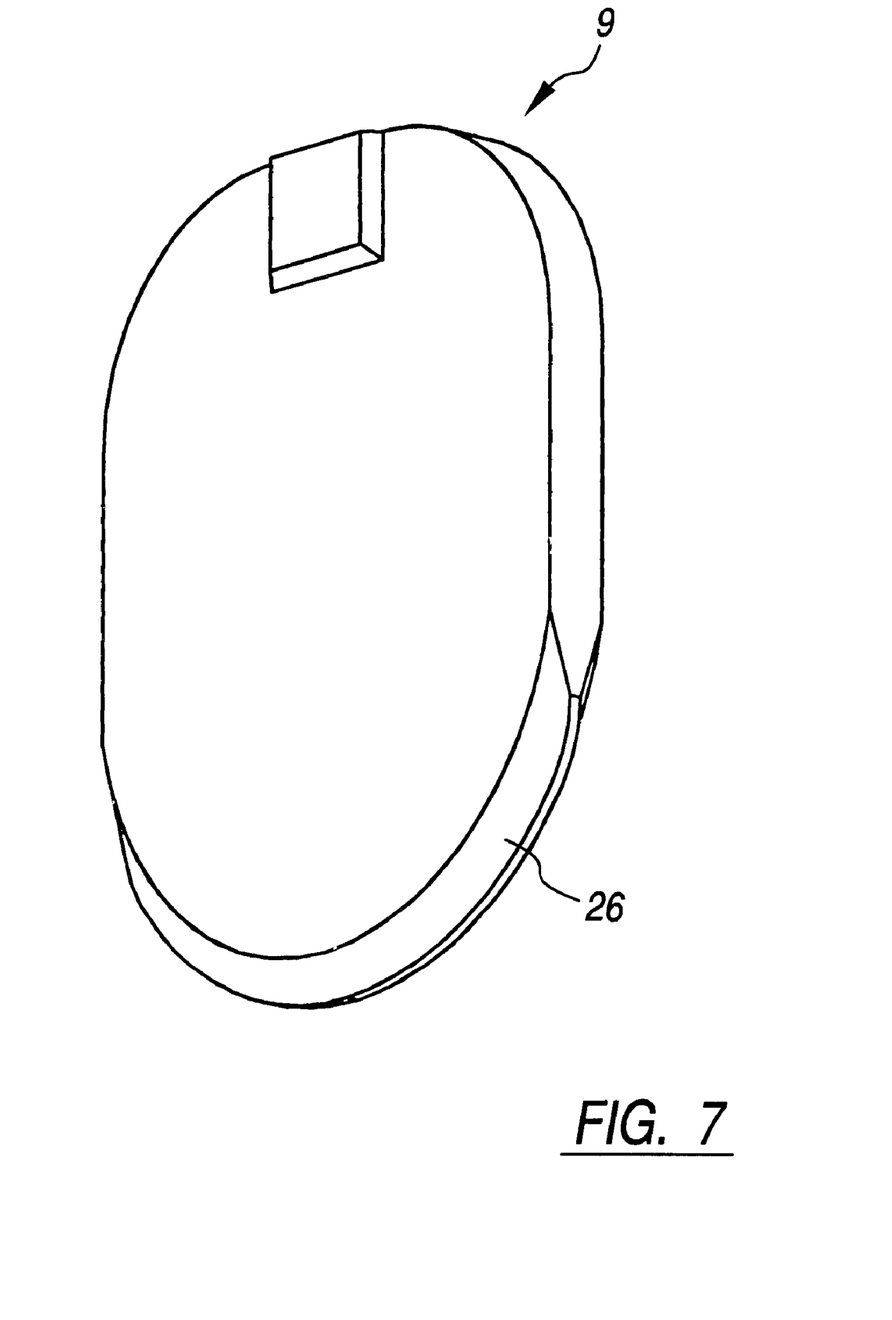
FIG. 7 is a schematic, perspective view of a plate-shaped slide which is used in the valve of FIG. 1.

The aforesaid plate-shaped slide 9 of PVC-U is shown in schematic, perspective view in FIG. 7, wherein it is apparent that said slide can be received in packing 14 with a proper fit via opening 23. Slide 9 has a slightly pointed end 26, which is accommodated in its downward position in a correspondingly shaped groove which is present in the edge of opening 20 of packing 14.

The valve according to the invention is made of plastic material, which enables batch production in various dimensions and for various uses, with all valves exhibiting a high chemical resistance, for example against sea water, chlorine, acids, bases, etc. The present valve is in particular suitable for:

ebb and flood systems (pipe diameter 50–110 mm)

slop feeding systems and liquid manure discharging systems (pipe diameter 50–160 mm)

canalization and desert cultivation (pipe diameter 200–1000 mm)

desalination plants and drink water preparation (pipe diameter 50–400 mm)

contaminated ground water purification (pipe diameter 50–400 mm)

private and public swimming pools (pipe diameter 50–250 mm)

filters and circulation systems (pipe diameter 50–250 mm)

basins as communicating vessels and filters (pipe diameter 50–250 mm)

the galvanic industry (metal treatment and petrochemistry (pipe diameter 50–160 mm)

fish processing machines and chicken slaughtering lines (pipe diameter 50–250 mm)

exhaust systems and fruit storage plants (pipe diameter 50–110 mm)

sewage systems (pipe diameter 110–600 mm)

It is noted that the term pipe diameter used herein in connection with the embodiments of FIGS. 1–4 is understood to mean the inside diameter of pipe portions 13.

What is claimed is:

1. A valve substantially made of plastic material consisting of a housing which is provided with connecting means for connecting said housing to a conduit for a flowing medium, which housing contains a slide which is capable of movement transversely to the direction of flow of said medium between a closed position in which the flow can be shut off, and an open position, in which said flow can be released, wherein said housing comprises a lower housing, in which the connecting means are located, and an upper housing for the slide, which is detachably connected therewith, and a seal disposed in a complementary recess in the lower housing, wherein the seal is removable from the lower housing upon removal of the upper housing from the lower housing, and wherein the seal is a singular integrally formed member enveloping the slide and having a circular through opening, an insert opening portion for sealing and guiding the slide and a plate-like collar portion for sealing the upper and lower housings.

2. A valve according to claim 1, wherein the lower housing and the connecting means are made in one piece.

3. A valve according to claim 1, wherein said housing has been formed by means of an injection moulding technique.

4. A valve according to claim 1, wherein said housing is at least substantially made of non-reinforced plastic material.

5. A valve according to claim 1, wherein said slide is at least substantially made of non-reinforced plastic material.

6. A valve according to claim 1, wherein said plastic material is selected from the group consisting of PVC-U, PE, PP, ABS, PVC-C and PVDF.

7. A value according to claim 1, wherein said housing is at least substantially made of a reinforced plastic material.

8. A valve according to claim 1, wherein said slide is at least substantially made of a reinforced plastic material.

9. A valve according to claim 7, wherein said reinforced plastic is glass fibre or a mineral-reinforced plastic.

10. A valve according to claim 8 wherein said reinforced plastic is glass fibre or a mineral-reinforced plastic.

11. A valve according to claim 1, wherein said slide is at least substantially made of a metal.

12. A valve according claim 1, wherein said valve is provided with a manually, mechanically, electrically, pneumatically or hydraulically operated driving mechanism.

13. A valve according to claim 1, wherein said connecting means comprise a flanged connection, a threaded connection, a key/sleeve connection and/or a glued connection.

14. A valve according to claim 1, wherein said seal is at least substantially an envelope-like seal.

15. A valve according to claim 1, wherein said seal has been made by means of an injection molding technique.

16. A valve according to claim 1, wherein said seal is at least substantially made of a rubber, which is selected from the group of NBR, EPDM and F.P.M. ("Viton").

* * * * *